Jan. 29, 1952
W. W. MEYER
2,583,867
SHAFT SEAL
Filed May 4, 1945
2 SHEETS—SHEET 1
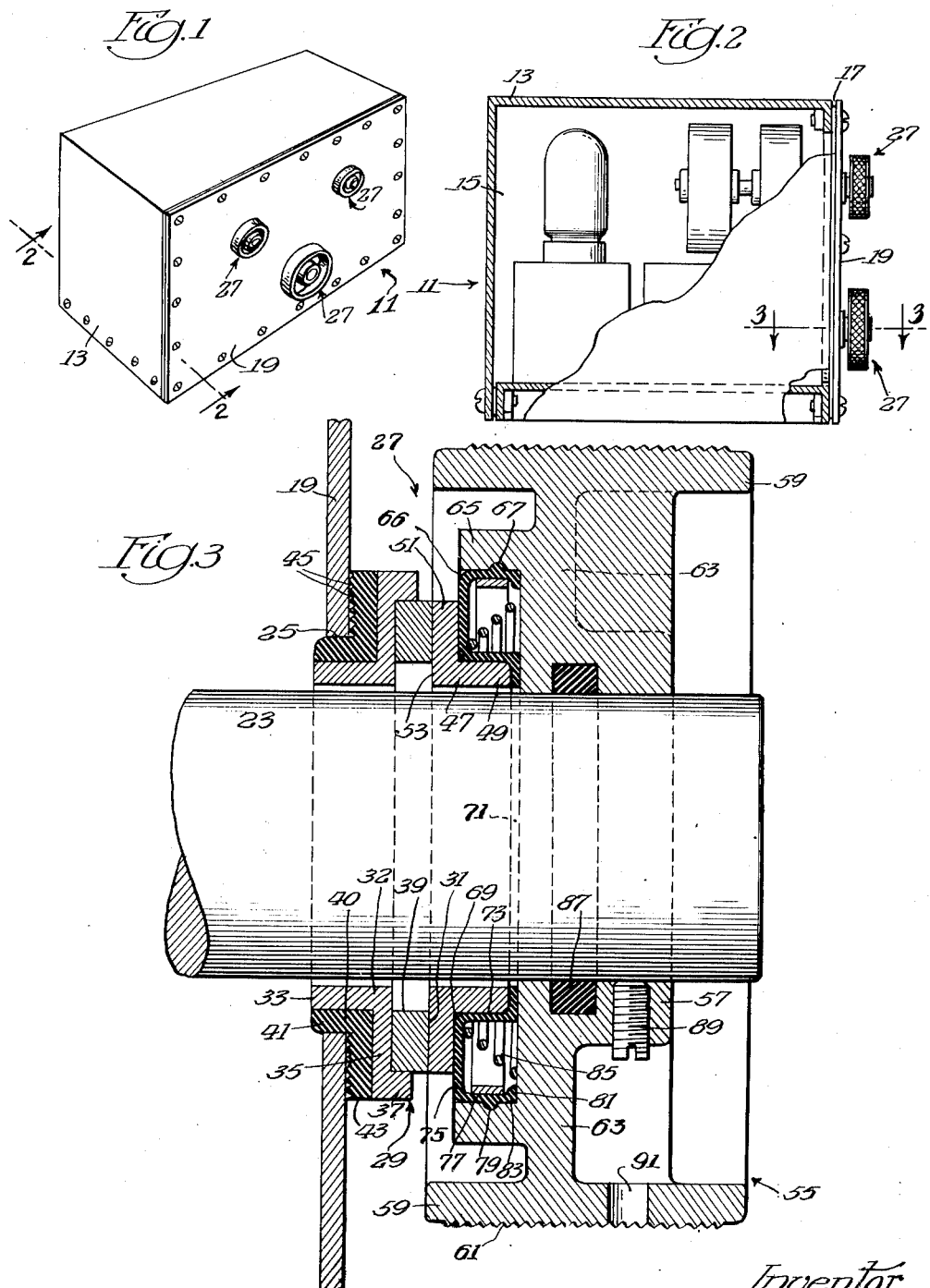
Inventor
Walter W. Meyer
By: Spencer Marzall, Johnston & Cook
attys Jan. 29, 1952  W. W. MEYER  2,583,867
SHAFT SEAL
Filed May 4, 1945  2 SHEETS—SHEET 2
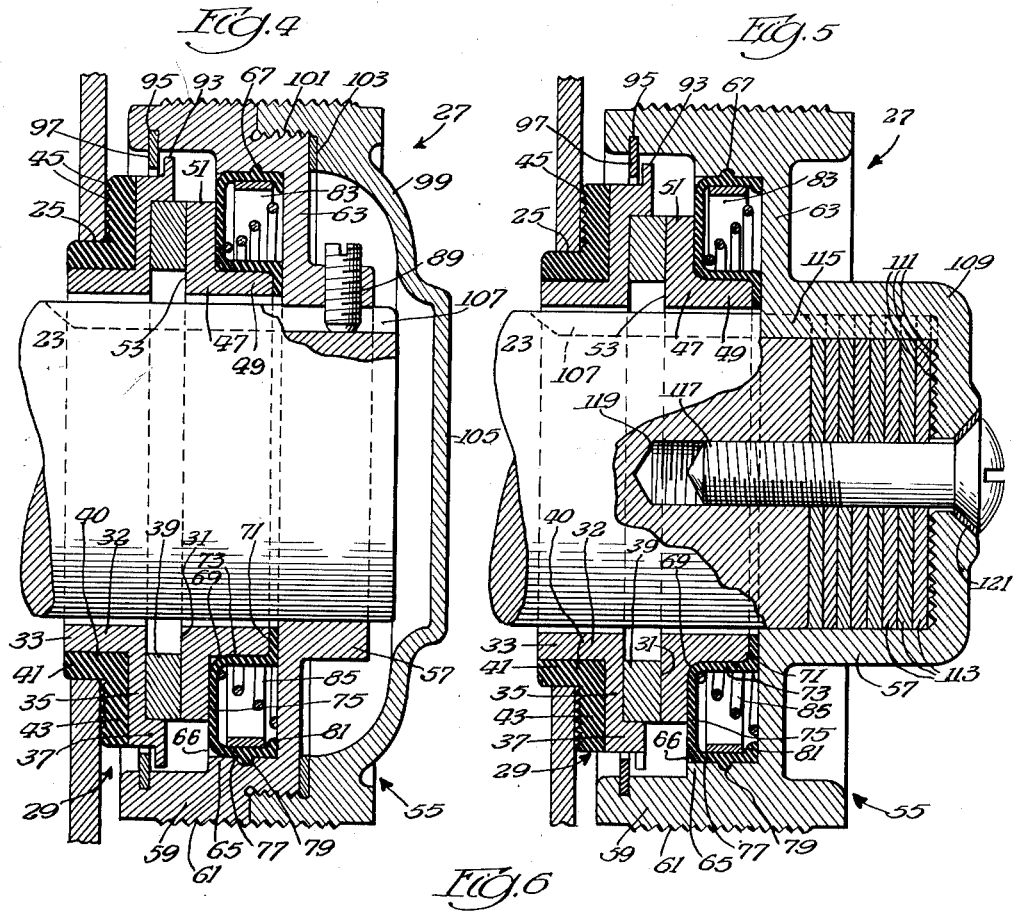
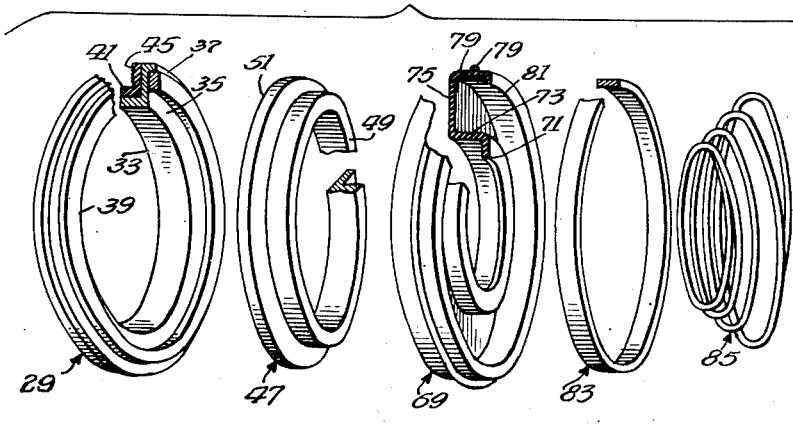
Inventor
Walter W. Meyer
By Spencer, Marzall, Johnston & Cook
Attys Patented Jan. 29, 1952

2,583,867

UNITED STATES PATENT OFFICE 2,583,867

SHAFT SEAL

Walter W. Meyer, Arlington Heights, Ill., assignor to Rotary Seal Company, Chicago, Ill., a corporation of Illinois Application May 4, 1945, Serial No. 592,033

7 Claims. (Cl. 286—11)

My invention relates in general to seals and sealing and has more particular reference to the hermetic sealing of electrical equipment, more especially electronic apparatus.

The operation of electrical equipment is susceptible of impairment as a result of excessive humidity of the surrounding atmosphere. Electronic operating equipment, which involves capacity and other reactive relationships in the circuits comprising the equipment, is particularly vulnerable to moisture changes and may become inoperative if such capacity relationships are appreciably altered, as by undue increase in the moisture content of insulation or other elements of the apparatus which afford capacity factors in the circuits involved.

An important object of the present invention is to provide sealed container means, of a substantially hermetic character, for protecting electrical apparatus of the sort likely to be affected by moisture; a further object being to provide sealed means, of the character mentioned, embodying novel shaft seals for the stems or spindles required for adjusting the sealed equipment from outwardly of the container in which it is enclosed.

Another important object is to provide sealed electrical equipment that will perform its intended functions regardless of surrounding moisture conditions.

Another important object is to provide an adjusting knob or handle unit adapted for application to portions of the movable stem of adjustable electrical apparatus, said unit, when mounted on the stem, serving to seal, in substantially hermetic fashion, an opening in a wall through which the stem extends, while allowing the stem to move freely in said opening.

Another important object is to provide a unit of the character mentioned which may be applied to the stem without altering or fitting the stem to receive the unit.

Among the other important objects of the invention is to provide means whereby relatively sensitive electrical equipment can be assembled and installed at a factory, calibrated and adjusted under optimum operating conditions and sealed up in a fashion to preserve the same in operating condition regardless of any atmospheric humidity changes to which the apparatus may thereafter be exposed; a further object being to provide electrical apparatus of the character mentioned that is capable of giving trouble-free operation throughout an extended life under conditions of excessive atmospheric humidity, such as are frequently encountered in tropical and other regions.

The foregoing and numerous other important objects and inherent functions of the invention will become apparent as the same is more fully understood from the following description, which, taken in connection with the accompanying drawings, discloses preferred embodiments for the purpose of demonstrating the invention.

Referring to the drawings:

Fig. 1 is a perspective view of sealed electrical apparatus embodying the present invention;

Fig. 2 is a sectional view taken substantially along the line 2—2 in Fig. 1;

Figs. 3, 4 and 5 are sectional views, taken substantially along the line 3—3 in Fig. 2, to illustrate modified forms embodying the invention; and Fig. 6 is an exploded view illustrating in perspective certain of the parts shown in Figs. 3, 4 and 5.

To illustrate the invention, the drawings show sealed electrical equipment 11 comprising an hermetic container 13 and electrical apparatus 15 enclosed within the container.

The container may conveniently be formed of sheet metal plates suitably bent and secured together in any preferred fashion to form the enclosing container 13, moisture excluding gaskets 17, which may comprise a rubber-like material or other suitable moisture excluding material, being preferably applied at the joints between the container forming plates. The container preferably includes a removable cover plate 19, which forms a part of the container.

The enclosed apparatus 15 may include one or more adjustable devices 21, such as adjustable resistors, condensers, reactors, switches or other adjustable devices having adjusting stems 23 extending outwardly of the container 13, as through openings 25 in a container wall, such as the cover plate 19. In order to provide for manipulation of a stem portion projecting outwardly through an opening 25 and also to seal the opening in substantially hermetic fashion, a combination sealing and operating unit 27 is provided for attachment on such outwardly extending stem portion.

The unit 27 comprises a seal ring 29 adapted to loosely surround the stem 23 at the opening 25 and to sealingly engage the wall portion 19 surrounding said opening, said ring forming an annular seal seating surface 31 facing outwardly of the wall 19 at the opening 25. To this end, the member 29 comprises a metallic, preferably brass, mounting ring 32 having a cylindrical portion forming a collar 33 sized to loosely encircle the stem within the opening and an annular flange portion 35 extending outwardly of the collar 33 at the end thereof outwardly of the opening 25, said flange portion being sized to substantially overlie the edge portions of the wall 19 defining the opening 25.

At its periphery, the flange 35 is provided with an integral rib 37 extending therefrom in a direction away from the wall 19 and forming an annular seat into which is pressed a bearing ring 39 of relatively soft, wearing material, such as carbon, or other suitable material. The ring 39 is press-fitted into the seat afforded by the annular rib 37 and provides the seal seat 31 in its outer face. The mounting ring 32 carries an annular sealing gasket 40 secured to the outer surfaces of its collar portion 33 and to the surface of its flange portion opposite from the ring 39. The gasket 40, to this end, comprises a cylindrical portion 41 surrounding the collar 33 and a flange portion 43 engaging the flange 35, said flange portion 43 having a face formed with concentric sealing ribs 45 adapted to engage the outer surface of the wall 19 adjacent the opening 25, the cylindrical portion 41 of the gasket being sized to compressingly fit within the opening 25.

The gasket 40 may comprise any suitable material of a character adapted to resist deterioration and preferably comprises synthetic rubber, such as neoprene, or like material. The gasket, also, is preferably bonded to the facing surface of the support ring 32, as by molding it in place under the influence of heat and pressure, or by means of cement or other adhesive medium.

Cooperating with the ring 39 and forming a running seal with the sealing surface 31 is a seal ring 47 having a cylindrical portion forming a collar 49 adapted to loosely encircle the stem 23, and a portion 51 forming an outstanding flange having a surface 53 adapted to engage and make a running seal with the surface 31 of the ring 39. The sealing ring 47 preferably comprises a material relatively harder than the material of the ring 39 against which it works, or a relatively soft material may be used having a hardened surface 53 formed in any suitable manner, as by plating the surface with chromium. The member 47, to this end, may comprise brass when working with a ring 39 comprising carbon, or chromium plated brass when working with a ring 39 of material harder than brass.

The unit 27 also comprises a member 55, which may be conveniently formed as a knob, wheel, pulley or other turnable member for manual or mechanical operation, and having a hub portion 57 adapted to form a substantially friction fit with the stem 23. The wheel or knob has a rim 59, the outer surface of which may be roughened or knurled, as at 61, or otherwise finished to facilitate gripping the same by hand or by belt, chain or other driving member, for the purpose of turning the same. The hub and rim of the wheel are preferably connected by an integral web or flange 63 and the wheel 55, in its side facing the wall 19, is formed with an annular shoulder 65 forming a pocket 66 having an annular groove 67 within and facing inwardly of said pocket.

The seal ring 47 carries a flexible gasket 69 having a central flange 71 adapted to overlie the end of the cylindrical portion 49 of the ring. Outwardly of said central annular flange 71, the gasket 69 has a cylindrical portion 73 adapted to overlie the outer surfaces of the ring portion 49, a flange portion 75 adapted to lie against the portion 51 of the ring, and a terminal cylindrical portion 77 spaced from and outwardly of the portion 73. In its outer surfaces, the gasket portion 77 is formed with a rib 79 and the free edge of said portion is provided with an inwardly extending flange 81.

The gasket 69 may comprise any suitable flexible gasket material but is preferably made of rubber-like material, such as neoprene, and is bonded to the contacting surfaces of the ring 47 as by molding it in place on said ring under the influence of heat and pressure, or by means of an adhesive cement. The gasket, however, is of thin section and has a flexible diaphragm action.

The gasket 69 is adapted to fit snugly into the pocket 66 with the gasket rib 79 extending and interlocking in the groove 67 to aid in retaining the gasket in the pocket. The gasket need not necessarily be preformed with a rib 79, for the material of a ribless gasket will, upon assembly in the pocket 66, flow into the groove 67 and thus form an interlocking rib, in situ. To this end, a retaining band 83 may be inserted within the gasket flange portion 77 and retained in place therein by the terminal flange 81 for the purpose of holding the flange portion in snug engagement with the annular shoulder 65 of the knob member 55. Within the gasket 69, spring means 85 is assembled. Any suitable or preferred spring means may be used. As shown, the spring 85 is of spiral helical configuration and bears at its relatively larger end upon the surface of the wheel forming the bottom of the gasket pocket. The opposite and relatively smaller end of the spring bears upon the gasket 69 at the junction of the portions 73 and 75 thereof. The spring, thus, serves to yieldingly urge the central portions of the gasket, and the seal ring 47 secured thereto, in a direction outwardly of the wheel pocket in which the gasket is anchored at its peripheral portions.

It will be seen from the foregoing that when the device is assembled upon the stem 23, and the operating knob is fastened and sealed upon the stem with the member 29 arranged in sealed position in the opening 25, a substantially hermetic seal is provided in the opening around the stem. To this end, the gasket 40 affords a tight seal with the wall of the sealed container. The surfaces 31 and 53, respectively, of the seal seat 39 and the seal ring 47 form a substantially tight seal between said members. The member 47 in turn is sealed by the gasket 69 to the knob 55, which in turn is sealed around and upon the stem 23.

Any suitable or preferred means may be employed for sealing the member 55 upon the stem. As shown in Fig. 3, more particularly, such sealing is accomplished by means of an annular gasket 87, which is seated in an internal annular groove formed in the hub 57 of the adjusting member. The gasket 87 is preferably thick enough to compressingly engage upon the surface of the stem 23. The hub 57, as shown in Fig. 3, may be secured in assembled position upon the stem by means of a set screw 89, an opening 91 being formed in the rim 59 in axial alignment with the set screw in order to facilitate manipulation of the same, as by means of a screw driver.

In Figs. 4 and 5, the seal seat member 29 extends within the rim 59 of the adjusting member 55 and the member 39 has a projecting rib 93 extending loosely and freely turnable within the rim 59, said rim being provided with an internal annular pocket 95 for the reception of a split holding ring 97 to retain the seat member 29 within the rim 59 while allowing the member 29 to move freely, within limits, with respect to the member 55. Such arrangement allows the device 27 to be fabricated and assembled as a unit ready for application upon the stem 23. Such construction, if desired, may be incorporated in the device as shown in Fig. 3.

The forms illustrated in Figs. 4 and 5, also, embody alternate means for sealing the adjusting member on the stem 23. To this end, as shown in Fig. 4, the adjusting member comprises a removable cover 99 having a rim formed for threaded engagement, as at 101, with the rim 59 of the adjustable member. The rim of the cover may be formed to provide an extension of the rim 59 if desired. The cover forms a seat for compressing an annular sealing gasket 103 upon the member 55 outwardly of its shaft embracing portions.

The cover member includes a central imperforate portion 105 within the rim and adapted to overlie and enclose the end of the stem 23 exposed at the hub 57 of the member 55. This arrangement is useful particularly where the stem 23 has a flattened or grooved configuration 107 in its terminal portions to receive the set screw 89. The detachable cover construction, however, may be applied where the projecting portions of the stem are cylindrical, and may, of course, if desired, be applied in the structure shown in Fig. 3 in place of the sealing gasket 87.

In the form shown in Fig. 5 of the drawings, the adjustable member 55 is formed with an integral cover portion 109 closing the end of the hub 57 in position to overlie the end of the stem 23. The inner face of the cover portion 109 may be provided with concentric ribs 111 and may serve to retain one or more sealing discs 113 against the end of the stem. The hub 57, also, may be provided with a projection 115 adapted to engage the cut-out portion 107 of the stem to prevent relative rotation of the member 55 with respect to the stem. The member 55 may be secured on the stem by means of a fastening screw 117 extending through a central opening in the portion 109 and central openings in the washers 113, said screw engaging a threaded axial bore 119 in the end of the stem and being held in place as by means of a lock washer 121 applied between the head of the screw and a screw head socket formed at the central opening of the portion 109.

It will be seen from the foregoing that devices embodying the present invention may be fabricated as substantially standard units to fit stems 23 and container openings 25 of standard size. Such standard units may be designed to accommodate appreciable variation, within limits, of the projecting length of the stem 23. The structure, however, will afford substantially hermetic sealing throughout the service life of the enclosed equipment and will exclude moisture from entering the container 13 even though the same be immersed in liquid.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein being preferred embodiments for the purpose of illustrating the invention.

The invention is hereby claimed as follows:

1. A seal for a turnable shaft extending in a wall opening affording a seal seat at the opening, comprising a wheel having a hub portion formed with an axial chamber for receiving the shaft and an annular shoulder concentric with and facing inwardly toward an open end of said chamber, means for securing the wheel on the shaft whereby the shaft may be turned by operation of the wheel, a seal ring having a sleeve-like portion, and resilient gasket means for sealing and supporting said ring on the said wheel, whereby said ring is adapted for application therewith to said shaft in position forming a running seal with said seal seat on the wall, said resilient gasket means comprising concentric circular flanges and an integral web portion interconnecting said circular flanges, one of said circular flanges being sized to sealingly engage within said annular shoulder of the wheel, and the other being sized to embrace and sealingly engage upon said sleeve-like portion of the seal ring.

2. A seal for a turnable shaft extending in a wall opening affording a seal seat at the opening, comprising a wheel having a hub portion formed with an axial chamber for receiving the shaft and an annular shoulder concentric with and facing inwardly toward an open end of said chamber, means for securing the wheel on the shaft whereby the shaft may be turned by operation of the wheel, a seal ring having a sleeve-like portion, resilient gasket means for sealing and supporting said ring on the said wheel, whereby said ring is adapted for application therewith to said shaft in position forming a running seal with said seal seat on the wall, said resilient gasket means comprising concentric circular flanges and an integral web portion interconnecting said circular flanges, one of said circular flanges being sized to sealingly engage within said annular shoulder of the wheel, and the other being sized to embrace and sealingly engage upon said sleeve-like portion of the seal ring, and spring means disposed in the space between said concentric circular flanges of the gasket means and bearing oppositely upon said wheel and upon said seal ring to normally urge said ring in a direction outwardly of said wheel.

3. A seal for a turnable shaft extending in a wall opening affording a seal seat at the opening, comprising a wheel having a hub portion formed with an axial chamber for receiving the shaft and an annular shoulder concentric with and facing inwardly toward an open end of said chamber, means for securing the wheel on the shaft whereby the shaft may be turned by operation of the wheel, a seal ring having a sleeve-like portion and a radial flange, resilient gasket means for sealing and supporting said ring on the said wheel, whereby said ring is adapted for application therewith to said shaft in position with its radial flange forming a running seal with said seal seat on the wall, said resilient gasket means comprising concentric circular flanges and an integral web portion interconnecting said circular flanges, one of said circular flanges being sized to sealingly engage within said annular shoulder of the wheel, and the other being sized to embrace and sealingly engage upon said sleeve-like portion of the seal ring, and spring means disposed in the space between said concentric circular flanges of the gasket means and bearing oppositely upon said wheel within said shoulder and upon the radial flange of said seal ring through the interconnecting web portion of the gasket means.

4. A seal for a turnable shaft extending in a wall opening affording a seal seat at the opening, comprising a wheel having a hub portion formed with an axial chamber for receiving the shaft and an annular shoulder concentric with and facing inwardly toward an open end of said chamber, means for securing the wheel on the shaft whereby the shaft may be turned by operation of the wheel, a seal ring having a sleeve-like portion and a radial flange, resilient gasket means for sealing and supporting said ring on the said wheel, whereby said ring is adapted for application therewith to said shaft in position with its radial flange forming a running seal with said seal seat on the wall, said resilient gasket means comprising concentric circular flanges and an integral web portion interconnecting said circular flanges, one of said circular flanges being sized to sealingly engage within said annular shoulder of the wheel, and the other being sized to embrace and sealingly engage upon said sleeve-like portion of the seal ring, and sealing means on said wheel for sealing said chamber against fluid leakage therethrough along a shaft on which said seal may be mounted.

5. A seal for a turnable shaft extending in a wall opening affording a seal seat at the opening, comprising a wheel having a hub portion formed with an axial chamber for receiving the shaft and an annular shoulder concentric with and facing inwardly toward an open end of said chamber, means for securing the wheel on the shaft whereby the shaft may be turned by operation of the wheel, a seal ring having a sleeve-like portion and a radial flange, and resilient gasket means for sealing and supporting said ring on the said wheel, whereby said ring is adapted for application therewith to said shaft in position with its radial flange forming a running seal with said seal seat on the wall, said resilient gasket means comprising concentric circular flanges and an integral web portion interconnecting said circular flanges, one of said circular flanges being sized to sealingly engage within said annular shoulder of the wheel, and the other being sized to embrace and sealingly engage upon said sleeve-like portion of the seal ring, said hub portion of the wheel having an annular internal groove formed, intermediate the opposite ends thereof, to snugly receive and support a sealing gasket of resilient rubber-like material, in said groove, in position to sealingly engage and embrace a shaft on which said wheel may be mounted to seal against fluid leakage along the shaft through said hub portion.

6. A seal for a turnable shaft extending in a wall opening affording a seal seat at the opening, comprising a wheel having a hub portion formed with an axial chamber for receiving the shaft and an annular shoulder concentric with and facing inwardly toward an open end of said chamber, means for securing the wheel on the shaft whereby the shaft may be turned by operation of the wheel, a seal ring having a sleeve-like portion and a radial flange, resilient gasket means for sealing and supporting said ring on the said wheel, whereby said ring is adapted for application therewith to said shaft in position with its radial flange forming a running seal with said seal seat on the wall, said resilient gasket means comprising concentric circular flanges and an integral web portion interconnecting said circular flanges, one of said circular flanges being sized to sealingly engage within said annular shoulder of the wheel, and the other being sized to embrace and sealingly engage upon said sleeve-like portion of the seal ring, and a removable cover sealingly mounted on said wheel in position enclosing an end of said hub to seal the wheel against fluid flow therethrough along a shaft on which said wheel may be mounted.

7. A seal for a turnable shaft extending in a wall opening affording a seal seat at the opening, comprising a wheel having a hub portion formed with an axial chamber for receiving the shaft and an annular shoulder concentric with and facing inwardly toward an open end of said chamber, means for securing the wheel on the shaft whereby the shaft may be turned by operation of the wheel, a seal ring having a sleeve-like portion and a radial flange, and resilient gasket means for sealing and supporting said ring on the said wheel, whereby said ring is adapted for application therewith to said shaft in position with its radial flange forming a running seal with said seal seat on the wall, said resilient gasket means comprising concentric circular flanges and an integral web portion interconnecting said circular flanges, one of said circular flanges being sized to sealingly engage within said annular shoulder of the wheel, and the other being sized to embrace and sealingly engage upon said sleeve-like portion of the seal ring, said wheel comprising wall means on said hub portion and enclosing an end of said axial chamber to form an end pocket for receiving the end of a shaft on which the wheel may be mounted and to seal against fluid flow along the shaft through said hub.

WALTER W. MEYER.

REFERENCES CITED

The following references are of record in the file of this patent:

UNITED STATES PATENTS

| Number | Name | Date |
| --- | --- | --- |
| 1,273,738 | Christensen | July 23, 1918 |
| 2,104,569 | Muth | Jan. 4, 1938 |
| 2,167,986 | Lignian et al. | Aug. 1, 1939 |
| 2,200,413 | Christman et al. | May 14, 1940 |
| 2,233,624 | Magnesen | Mar. 4, 1941 |
| 2,377,452 | Reynolds | June 5, 1945 |
| 2,411,509 | Endebak | Nov. 26, 1946 |